FIG-5

July 17, 1951  T. E. WESTALL  2,560,674
OVERHEAD LOADER FOR VEHICLES
Filed Dec. 19, 1947  7 Sheets-Sheet 7

INVENTOR,
THOMAS E. WESTALL.
BY
ATTORNEY

Patented July 17, 1951

2,560,674

UNITED STATES PATENT OFFICE 2,560,674

OVERHEAD LOADER FOR VEHICLES

Thomas E. Westall, Marion, N. C., assignor to Marion Machine Company, Marion, N. C., a corporation of North Carolina Application December 19, 1947, Serial No. 792,759

3 Claims. (Cl. 214—131)

This invention relates to a mechanism adapted to be mounted on a tractor or any suitable vehicle and providing scoop means disposed in front of the tractor with booms and levers mounted on each side of the tractor and having hydraulically operated means for forcing the scoop into material to be moved and for raising the scoop up over the tractor and inverting the scoop at the rear of the tractor and dumping material into a waiting truck or other vehicle. This type of mechanism is often referred to as an overhead loader and is adapted to do excavation work and load the material as it excavates the same.

It is an object of this invention to provide an improved mounting for pivotally supporting the booms of an overhead loader of the type described comprising a lower framework adapted to be pivotally secured to the rear axle of a tractor or the like and to project forwardly beneath the mid-portion of said tractor and to an intermediate portion to which the booms are pivotally connected. The framework has upstanding members on the front end thereof provided with planar surfaces which are adapted to be engaged by the booms when they are lowered to a forward position and these upstanding members are connected to the frame of the tractor by means of links which are pivotally connected to the intermediate portions of pivoted arms whose front ends are resiliently engaged at the upper and lower surfaces thereof by compression springs supported by a member secured to the frame of the tractor, these compression springs serving to absorb shocks of the booms engaging the surfaces of said uprising members on the framework as the shock is transmitted to the frame of the tractor.

It is another object of this invention to provide an apparatus of the type described wherein the booms are off-set at the point at which they are pivotally connected to the said framework and the rear ends of the booms are provided with resiliently mounted bumpers which are adapted to engage the lower framework as the booms are elevated to a substantially vertical position and in the course of which the scoop, which is pivotally connected to the booms by means of scoop arms, is moved to a position rearwardly of the tractor in an overhead loading operation. Thus, due to the resilient mounting at the front end of said framework and the resilient bumpers in the rear ends of the booms, the rocking movement imparted to the framework which is pivotally supported by the rear axle of the tractor is alternately absorbed by the compression springs disposed at the front of the tractor and is also absorbed by the bumpers disposed at the rear ends of the booms.

Some of the objects of the invention having been stated, other objects will appear as the description proceeds when taken in connection with the accompanying drawings, in which—

Figure 3 is a view similar to Figures 1 and 2 but showing both the booms and the scoop arms in a further raised position;

Referring more specifically to the drawings, the numeral 10 indicates a tractor having rear wheels 11 and 11' and front wheels 12 and 12'. The tractor also has a rear axle 13, a seat 14, for the driver, a steering wheel 15, and a conventional gear shift lever 16. The tractor also has a conventional bed frame 18 on which is mounted an internal combustion engine, not shown, which is connected in a conventional manner to the rear wheels of the tractor for driving the same. It is with a conventional tractor of this nature or with any other suitable vehicle that the overhead loading mechanism is adapted to be associated.

Figure 1:
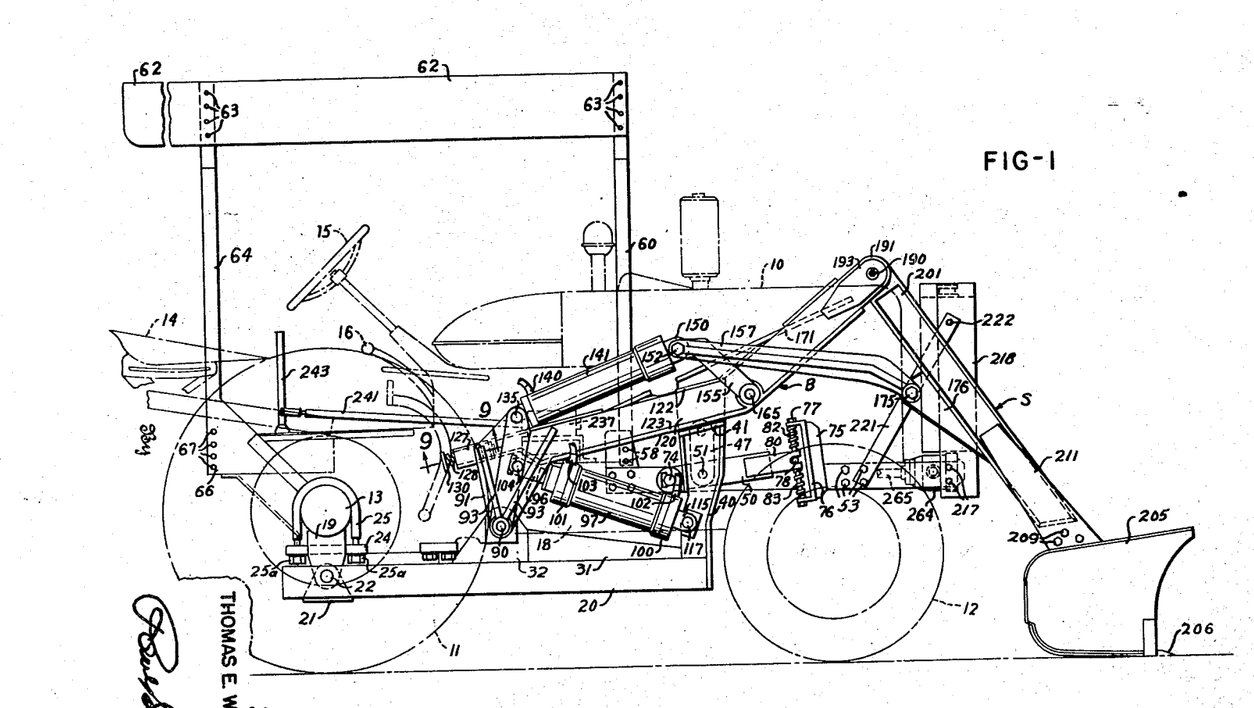
Figure 1 is a side elevation of the apparatus and showing the same associated with a tractor which is shown in phantom.
Figure 4:
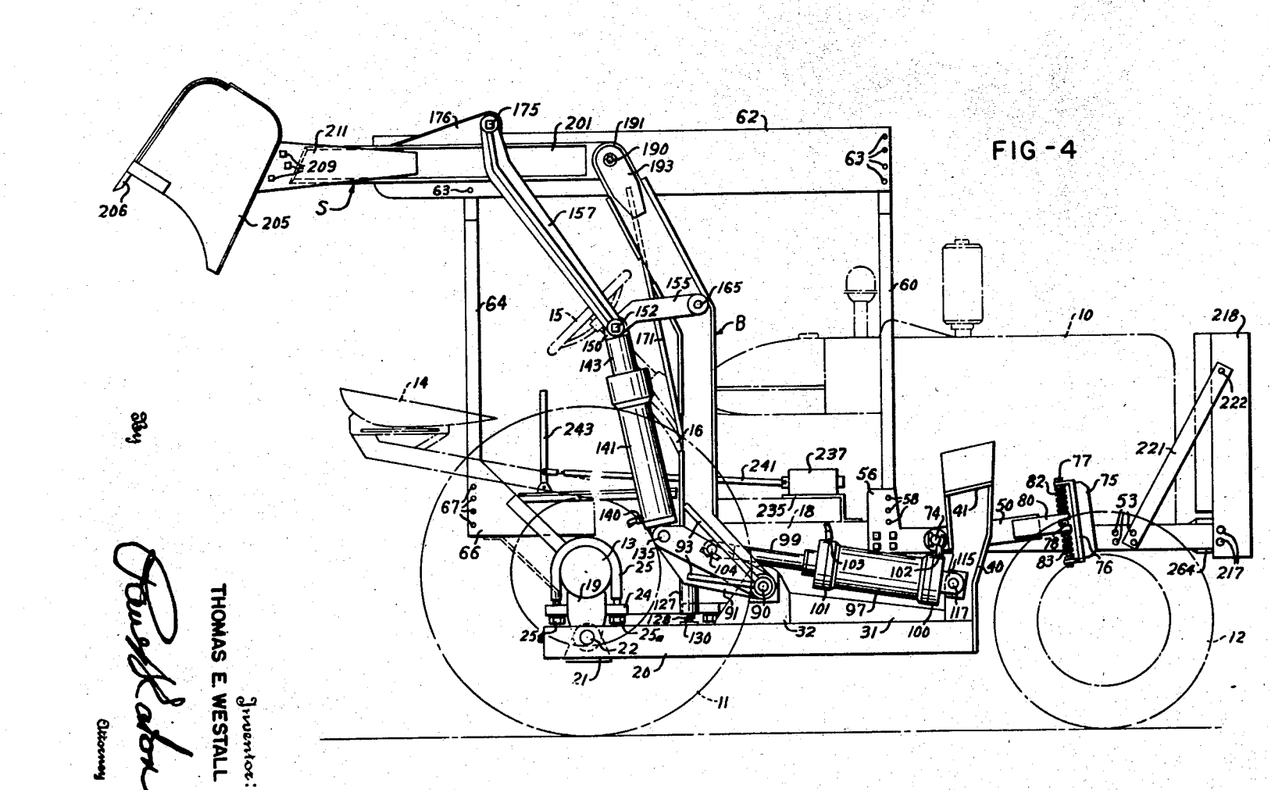
Figure 4 is a view similar to the three preceding figures but showing the parts in fully dumping position.
Figure 5:
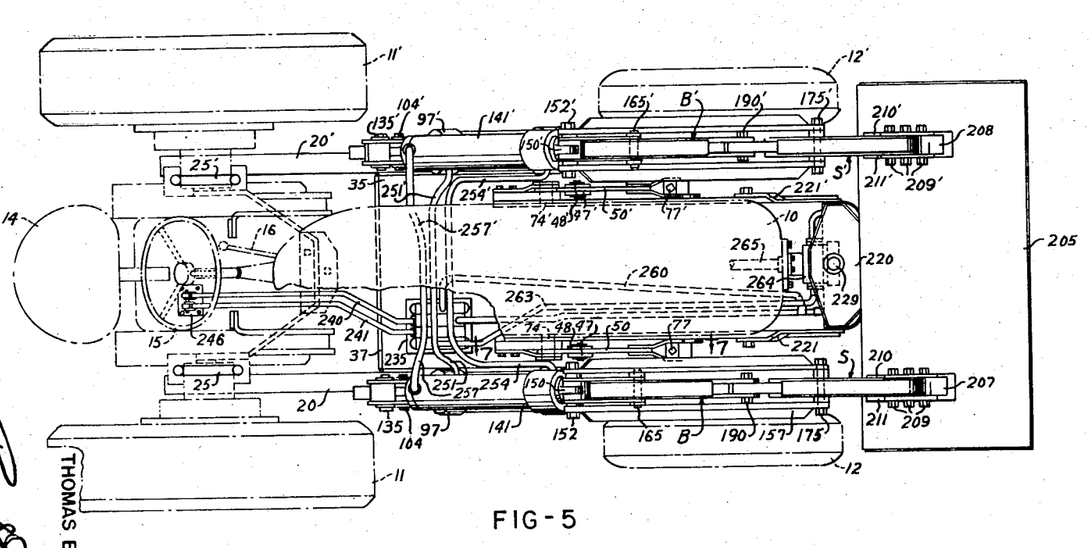
Figure 5 is a top plan view of the apparatus shown in Figure 1 and omitting the cover which shields the driver of the tractor.

In order to support the overhead loading mechanism, suitable longitudinal frame members 20 and 20' are provided, the rear ends of which have brackets 21 and 21' provided with suitable openings in which pins 22 and 22' are mounted, said pins also penetrating suitable coinciding holes 23 and 23' in the bars 20 and 20' respectively (Figures 1, 3 and 4). These stub shafts 22 and 22' are set in position by means of suitable set screws 28 and 28'.

Penetrated by these shafts 22 and 22' are members 19 and 19' having a horizontally disposed portion 24 and 24' respectively thereon, which portions have vertically disposed holes therein which are penetrated by the free ends of U-bolts 25 and 25' which encircle the axle housing 13 and 13' on each side of the tractor and slidably penetrate the holes in members 24 and 24' and have suitable nuts 25a on the lower ends thereof for supporting the rear end of the frame bars 20 and 20', respectively.

Figure 6:
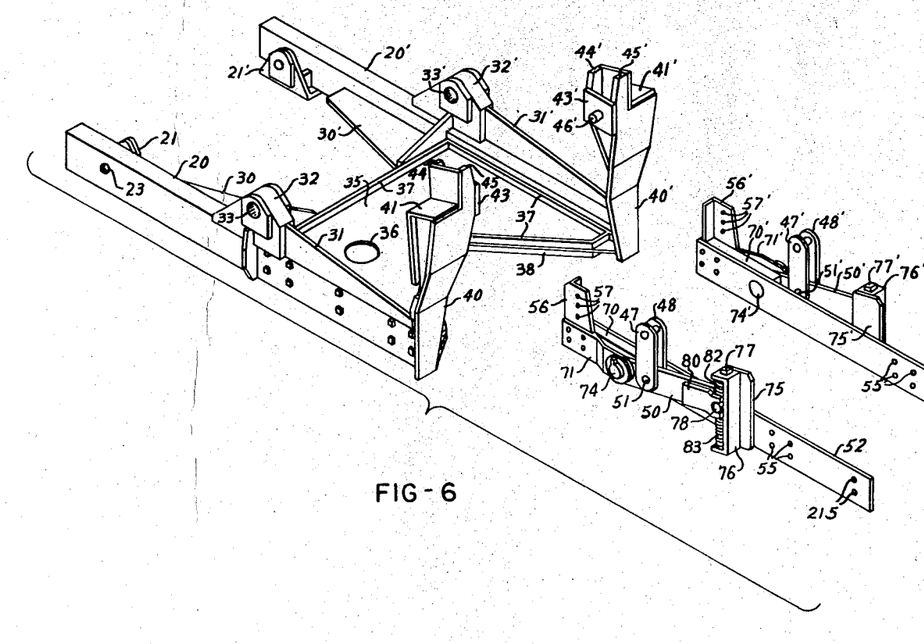
Figure 6 is an isometric view of the two framework members which are secured beneath and project from each side of the tractor.

The frame members 20 and 20' project forwardly and have reinforcing plates 30 and 30' secured to their proximate surfaces and also have uprising reinforcing plates 31 and 31' and secured to the bar 20 and the plates 30 and 31, and to bar 20' and plates 30' and 31' are bearing blocks 32 and 32' which have holes 33 and 33' passing horizontally therethrough (Figure 6). Also, secured between the proximate edges of the frame bars 20 and 20' is a plate 35 having a suitable hole 36 therethrough for access to the drain plug of the engine and this plate is surrounded by a reinforcing rib 37 for rigidity, and it also has on the lower surface thereof a suitable reinforcing rib 38 for reinforcing purposes, which rib is secured by welding.

Welded to the front end of frame bars 20 and 20', respectively, are the uprising members 40 and 40' (Figure 6) which at their upper ends have surfaces 41 and 41', respectively, on which the booms to be later described will rest in their lowermost positions. On the proximate upper surfaces of the members 40 and 40' are welded plates 43 and 43', respectively, the plates being welded to suitable substantially parallel ribs 44 and 45 and 44' and 45', respectively. These plates are penetrated by suitable stub shafts 46 and 46' which also pass through the links 47 and 48 and 47' and 48' respectively, as well as through the plates 43 and 43' to pivotally support these plates 47, 48, 47' and 48', respectively.

The lower ends of the plates 47 and 48, 47' and 48' respectively lie on opposite sides of links 50 and 50' respectively and are pivoted thereto by means of pivot bolts 51 and 51' respectively. Secured on opposite sides of the bed plate 18 of the tractor, are bars 52 and 52', respectively. The front ends of these bars 52 and 52' being secured to the plate 18 by suitable screws 53 passing through suitable holes 55 and 55' respectively (Figure 6) and being threadably imbedded in the base 18 of the tractor.

The rear ends of these bars 52 and 52' have suitable upright angle pieces 56 and 56' respectively provided with suitable holes 57 and 57' respectively through which suitable screws 58 (Figures 1, 3, 2 and 4) are passed to threadably secure a suitable inverted U-shaped frame bar 60 at its lower ends in position. The U-shaped frame bar 60 has the front end of a protecting cover 62 riveted thereto by means of a plurality of rivets 63. The rear end of the cover 62 is likewise secured to a similar inverted U-shaped bar 64 and the lower ends of the U-shaped bar 64 are secured to suitable plates 66 on each side of the tractor by means of bolts 67.

Between the angle brackets 56 and 56' and the exterior surfaces of the bars 52 and 52' are welded suitable blocks 70 and 70' and to the exterior of these angle plates 56 and 56' are suitably secured plates 71 and 71' which project outwardly and forwardly and stand in spaced relation to the blocks 70 and 70' and the bars 52 and 52'. The plates 71 and 71' are penetrated by stub shafts 74 and 74' on which the rear ends of members 50 and 50' are pivoted.

On the exterior surface of bars 52 and 52' are welded plates 75 and 75' (Figures 6, 7 and 8) which have welded thereto suitable vertically disposed U-shaped brackets 76 and 76', the horizontal end portions of which are penetrated by bolts 77 and 77'. The bolt 77 has slidably mounted thereon a sleeve 79 which has outwardly projecting portions 78 on each side thereof which are slidably engaged by notches in the forward ends of plates 80 and 80' welded to the forward ends of the links 50 and 50', respectively.

Mounted around the bolt 77 and above and below the sleeve 79 are compression springs 82 and 83 which constitute important features of the present invention and which tend to restrict upward and downward movement, respectively, of the free ends of the links 50 and 50', as will be later explained. Mounted in the holes 33 and 33' are corresponding pivot pins 90, only one of which is shown (Figures 1, 2, 3 and 4), on opposed ends of which laterally spaced, off-set side plates 91 on each of a pair of booms broadly designated at B and B' are pivotally mounted. These plates 91 have suitable reinforcing ribs 93 on opposed sides thereof.

Between the plates 91 on opposed sides of the tractor 10, pins 104 and 104' are disposed (Figure 4) on which are oscillatably mounted one end 96 of corresponding piston rods 99 and 99' (Figures 1, 2 and 10) which project into corresponding cylinders 97 and 97' on opposed sides of the tractor. The cylinder 97' is shown only in Figure 10, although it is to be understood that the structure on opposed sides of the tractor 10 is symmetrical. It will also be observed in Figure 10 that the cylinders 97 and 97' have respective pistons 98 and 98' mounted for longitudinal sliding movement therein to which the inner ends of the respective piston rods 99 and 99' are connected.

Both of the cylinders 97 and 97' are identical and it will be observed in Figures 1, 2, 3 and 4 that the cylinder 97 has caps 100 and 101 mounted on the opposed ends thereof and which are provided with nipples 102 and 103, respectively, by means of which hydraulic fluid can be admitted to either end of the cylinder 97.

Figures 7, 8, 9:
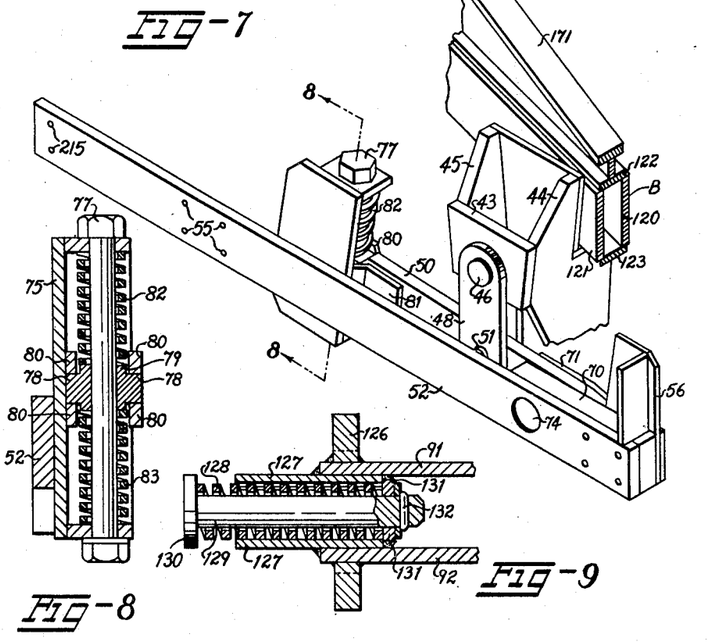
Figure 7 is an isometric view taken from substantially along the line 7—7 in Figure 5 and looking outwardly of the central remote portion of Figure 6 and showing the front and rear frames in overlapping or assembled position.
Figure 8 is a vertical sectional view taken along the line 8—8 in Figure 7.
Figure 9 is a longitudinal sectional view looking upwardly and taken along the line 9—9 in Figure 1.

It will be observed in Figure 7 that the boom B which is identical to the boom B' except being opposite hand, is composed of side plates 120 and 121 and top and bottom plates 122 and 123. The laterally spaced off-set side plates 91 are welded to the lower or rear ends of the side plates 120 and 121.

Figure 2:
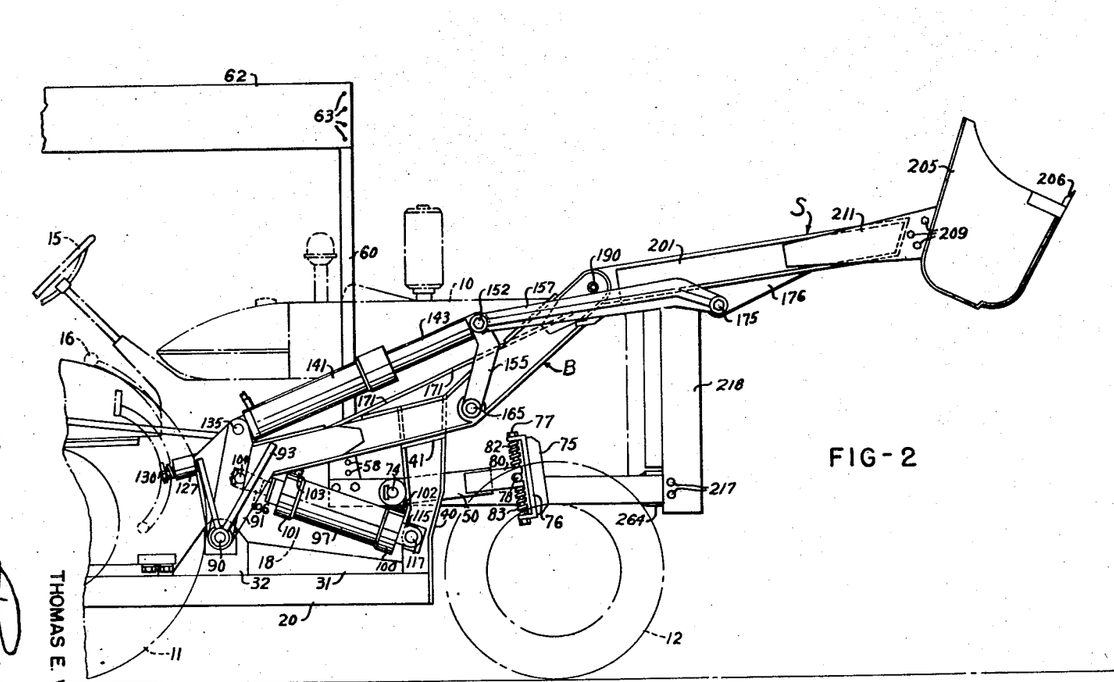
Figure 2 is a view similar to Figure 1 but showing the scoop arms and scoop in a different position.

It will be observed in Figure 9 that the back ends of the plates 91 associated with the boom B have a tubular member 127 therebetween and projecting rearwardly beyond the same when the booms B and B' are in the forward or lowered position shown in Figures 1 and 2.

The tubular member 125 is welded between these plates 91 and has disposed therein a compression spring 128 which surrounds a piston 129 having an enlarged portion or bumper 130 at its outer free end. The inner end of the tubular member 127 is closed by a plate 131 and the piston 129 has a limiting pin 132 projecting therethrough transversely thereof which limits its outward movement. This piston 129, the bumper 130 and its associated compression spring 128 constitute important features of the present invention and these serve as a shock absorber when the associated parts reach the position shown in Figure 4 and the bumpers 130 engage the side plates 20 and 20' (Figure 6).

The plates 91 associated with the boom B are penetrated by a pin 135 (Figures 1, 2, 3 and 4) on which the base of a cylinder 141 is pivotally mounted, this base of the cylinder 141 having a nipple 140 extending therefrom which communicates with the interior of the cylinder 141.

Figure 10:
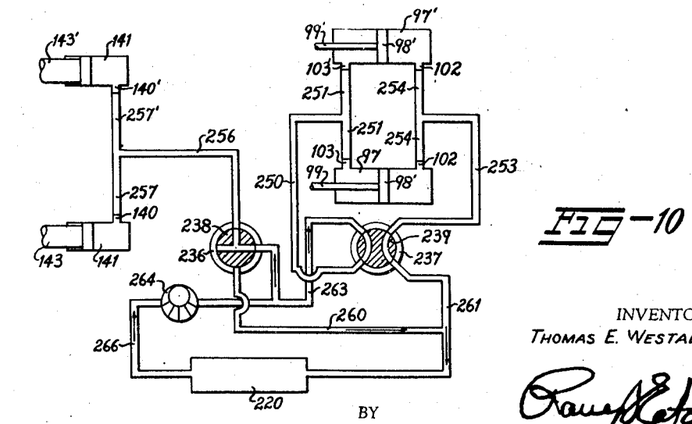
Figure 10 is a schematic diagram of the hydraulic system.

Referring to Figure 10, it will be observed that the cylinders 141 and 141' have respective pistons 143 and 143' mounted for longitudinal sliding movement therein and the free ends of these pistons (Figures 1, 2, 3, 4 and 5) are provided with respective lugs 150 and 150' which are penetrated by respective bolts 152 and 152'.

Since the parts on both sides of the tractor are identical, only those parts on the right-hand side thereof will be described in detail and the parts on the left-hand side thereof will bear the same reference characters with the prime notation added thereto.

The lug 150 of the piston 143 is straddled by a pair of arms 155 and a pair of arms 157, both pairs of arms 155 and 157 being pivotally mounted on the bolt 152. The arms 155 project downwardly and forwardly and are pivotally mounted on a pin 165 (Figures 4 and 5) mounted in the boom B and penetrating the plates 120 and 121 thereof.

The links or arms 157 also project forwardly in Figures 1 and 2 and are pivotally mounted on a pin 175 penetrating plates 176 which project downwardly from the lower surface of a scoop arm S which is preferably of tubular construction and in rectangular cross-section. It will be observed in Figures 1, 2, 3 and 4 that the free end portion of the boom B extends at an angle relative to the rear portion thereof and the boom is reinforced by a reinforcing plate or bar 171 which is suitably secured thereto as by welding.

The forward end of the boom B is composed of plates 191 having reinforcing plates 193 welded to their remote vertical surfaces and the rear end of the scoop arm S is pivotally mounted between the plates 191 on a bolt 190 carried by the plates 191 and 193. The side plates of the scoop arm S which are pivotally mounted on the bolt 190 are indicated at 201.

The scoop arms S and S' project downwardly and forwardly in their normal position and their free ends are secured to a scoop 205 by means of brackets 207 and 208 welded to the top wall of the scoop 205, which brackets have plates 210 and 211 and 210' and 211', respectively, projecting upwardly and rearwardly therefrom which are penetrated by bolts 209 and 209', said bolts also penetrating the free or forward ends of the scoop arms S and S'. The scoop 205 is provided with a cutting piece 206 along the lower front edge thereof in Figure 1.

It has already been described how the plates 52 and 52' are secured to the front side portions of the bed plate 18 of the tractor. These plates 52 and 52' have respective holes 215 and 215' therethrough at their forward ends (Figure 6) which are penetrated by bolts 217 which secure the lower end of a tank frame 218 to the forward ends of the plates 52 and 52'. The tank frame 218 has an expansion tank 220 mounted therein (Figure 5) and the tank frame is braced by bars 221 and 221' secured to the tank frame by means of bolts 222 and also to the bars 52 and 52' by means of the bolts 53. The bolts 53 likewise penetrate the bars 52 and 52' and are imbedded in the bed plate 18 of the tractor, these bolts 53 penetrating holes 55 and 55' in the bars 52 and 52' (Figure 6) as heretofore described.

The tank 220 (Figure 5) is provided with a fluid inlet opening which is closed by a cap 229. Mounted on the bed plate of the tractor 10 is a support 235 which supports conventional manually operable valve mechanisms including housings 236 and 237 (Figure 10). The valves 236 and 237 have respective movable cores 238 and 239 therein which are manipulated by links 240 and 241 (Figure 5) each of which is connected to a corresponding lever 243 pivotally mounted on a plate 246 secured to the tractor frame. The valve housing 237 has a pipe 250 connected thereto which has branches 251 and 251' (Figures 5 and 10) which are connected to the rear ends of the cylinders 97 and 97' by means of the corresponding nipples 103 and 103'.

The valve housing 237 also has a pipe 253 extending therefrom which has branch pipes 254 and 254' extending therefrom and connected to the front ends of the boom cylinders 97 and 97' by means of the nipples 102 and 102'. The valve housing 236 has rising upwardly therefrom a pipe 256 which has branch pipes 257 and 257' which are connected to the rear ends of the scoop arm cylinders 141 and 141' by means of the nipples 140 and 140'.

Referring to Figure 10, it will be observed that the valve housing 236 has leading therefrom a pipe 260 which is connected intermediate the ends of a pipe 261 which extends from the valve housing 237 to one end of the expansion tank 220. Also, leading from the valve housing 237 is a pipe 263 which leads to one side of a pump 264 driven by a suitable power take-off shaft 265 (Figure 5) extending from the front of the tractor. The intake side of the pump 264 has a pipe 266 connected thereto which is connected to the end of the expansion tank 220 remote from the end to which the pipe 261 is connected.

It is thus seen that I have provided an improved mounting for the overhead loader for absorbing the shocks as they are transmitted from the scoop 205, the scoop arms S and S' and the booms B and B' to the frame members 20 and 20' and the conventional bed frame 18.

It is evident that the compression springs 82 and 83 will absorb the shock transmitted to the bed frame 18 whenever the booms B and B' are moved forwardly and downwardly from the position shown in Figure 3 to the position shown in Figure 1, since the booms B and B' then engage the surfaces 41 and 41' on the upper portions of the uprising members 40 and 40' and tend to move the front ends of the frame members 20 and 20' downwardly and this will, in turn, cause the links 47, 48 and 47', 48' (Figure 6) to transmit the shock of downward movement of the front ends of the frame members 20 and 20' to the arms 50 and 50' which are held in an optimum position by the compression springs 82 and 83.

On the other hand, when the scoop 205 moves from the position shown in Figure 1 through the position shown in Figure 3 to the position shown in Figure 4, the bumpers 130 associated with each of the booms B and B' absorb the initial shock of rearward movement of the booms B and B' as these bumpers 130 engage the corresponding frame members 20 and 20' and then both of the shock absorber means, including the bumper 130 and the compression springs 82 and 83 absorb the further shock of the booms B and B' as the scoop 205 moves to the position shown in Figure 4, because then the front end of the frame members 20 and 20' can move upwardly because of the connections between the uprising members 40 and 40' and the booms B and B' provided by the cylinders 97 and 97' and the corresponding piston rods 99 and 99'.

It is evident that the shock absorbing bumpers 130 associated with each of the booms B and B' will also assist in throwing the booms forwardly when the scoop 205 reaches the position shown in Figure 3 after assuming the position in Figure 4 and so as to assist in causing the booms B and B' to move forwardly through the position shown in Figure 2 to that shown in Figure 1.

I claim:

1. An improvement in an overhead loader adapted to be mounted on a vehicle, said overhead loader having a first substantially horizontally disposed frame pivotally connected to the rear end of the vehicle and extending forwardly therefrom and also having at least one pivoted boom pivotally mounted intermediate the ends of the first frame and extending substantially forwardly of the first frame, said improvement comprising a second frame carried by the vehicle and disposed at a higher elevation than the first frame, a pivoted lever arm pivotally mounted on at least one side of the second frame, an upstanding member disposed adjacent the front end of the first frame at at least one side thereof and extending upwardly substantially beyond the horizontal plane of the second frame, a link pivotally connected to the upstanding member at one end thereof and depending from the upstanding member and being pivotally connected at its other end intermediate the ends of said lever arm, a substantially U-shaped shock absorber bracket fixed to the second frame adjacent the free end of said lever arm, a pair of axially spaced compression springs extending between the legs of the U-shaped bracket and the proximate ends of the compression springs resiliently engaging opposed upper and lower surfaces of free end of the lever arm, said boom being adapted to strike the upper end of the upstanding member upon the boom being lowered, whereby upon the boom being lowered against the upper end of said upstanding member, the shock thereof will be transmitted through the link and lever arm to the compression springs to thus be cushioned thereby as the shock is transmitted to the second frame.

2. An improvement in an overhead loader adapted to be mounted on a vehicle, said overhead loader having a first substantially horizontally disposed frame pivotally connected to the rear end of the vehicle and extending forwardly therefrom and also having at least one pivoted boom pivotally mounted intermediate the ends of the first frame and exending substantially forwardly of the first frame, said improvement comprising a second frame carried by the vehicle and disposed at a higher elevation than the first frame, a pivoted lever arm pivotally mounted on at least one side of the second frame, an upstanding member disposed adjacent the front end of the first frame at at least one side thereof and extending upwardly substantially beyond the horizontal plane of the second frame, a link pivotally connected to the upstanding member at one end thereof and depending from the upstanding member and being pivotally connected at its other end intermediate the ends of said lever arm, a substantially U-shaped shock absorber bracket fixed to the second frame adjacent the free end of said lever arm, a pair of axially spaced compression springs extending between the legs of the U-shaped bracket and the proximate ends of the compression springs resiliently engaging opposed upper and lower surfaces of the free end of the lever arm, said boom being adapted to strike the upper end of the upstanding member upon the boom being lowered, whereby upon the boom being lowered against the upper end of said upstanding member, the shock thereof will be transmitted through the link and lever arm to the compression springs to thus be cushioned thereby as the shock is transmitted to the second frame, a spring loaded bumper on the rear end of said boom and being adapted to engage the upper surface of the first frame forwardly of the point at which the first frame is pivotally connected to the rear end of the vehicle to thereby partially absorb the shock of the boom transmitted to the vehicle as it is elevated to operating position for emptying the contents of the overhead loader and whereby the shock resulting therefrom will be additionally absorbed by the compression springs disposed at opposed upper and lower surfaces of the free end of said lever arm, and also whereby the sudden impact of the rear end of the boom against the upper surface of the first frame will tend to jar the front end thereof upwardly momentarily and then downwardly as the full weight of the boom is transmitted to the first frame to thus alternate the pressure exerted on the upper and lower compression springs successively with movement of the boom.

3. An improvement in an overhead loader adapted to be mounted on a tractor or the like, said overhead loader having a pair of transversely spaced pivoted booms disposed at opposed sides of the tractor and also having a pair of forwardly extending arms pivotally connected to the forward ends of the pivoted booms and on the free ends of which a suitable earth moving element is secured and also having a first fluid operated ram mounted on each of the booms and being connected to the corresponding arms for swinging the same about the free ends of the booms, said overhead loader also having a second fluid operated ram pivotally connected at one end thereof to each of the booms for transmitting movement to said booms, said improvement comprising a first subframe disposed below the vehicle, means pivotally connecting the rear end of said first subframe to the rear end of the vehicle, the first subframe having an upstanding abutment on each side thereof, a second subframe secured to the vehicle at a higher elevation than the first subframe and upwardly beyond which said abutments extend, a lever arm pivotally connected at its rear end to each side of the second subframe and extending forwardly therefrom, a link pivotally connected to each of said abutments and extending downwardly therefrom and also being pivotally connected at its lower end to the corresponding lever arm, one end of each of the second rams being pivotally connected to the upstanding abutment at the front end of the first subframe at each side thereof, a bracket secured to the second subframe and straddling the free front end of each of the lever arms, a pair of axially spaced compression springs carried by each of said brackets and engaging opposed upper and lower surfaces of the corresponding lever arm, each of said booms being pivotally mounted at its rear end on an intermediate portion of said first subframe and a resilient bumper on the rear end of each of said booms so positioned as to engage the upper surface of the first subframe upon the free ends of the booms being elevated to the limit of their upward movement whereby said resilient bumper will assist in absorbing the initial shock of each of the booms upon being elevated and whereby, upon the arms at the free ends of said booms being swung rearwardly of the free ends of said booms in elevated position, the shock therefrom will be absorbed by the bumper and by the compression springs engaging the upper and lower surfaces of the lever arms by virtue of the second ram being connected to the front end of the first subframe at one end thereof and being connected to the booms at the other ends thereof and also whereby upon the booms being lowered, they will engage the upper ends of the abutments and the shock thereof will also be absorbed by the compression springs engaging opposed sides of the lever arms and also whereby said resilient bumpers on the rear ends of the booms will assist in causing said booms to again move downwardly and forwardly at their ends upon the action of the second fluid operated rams being reversed for lowering the booms and their corresponding arms.

THOMAS E. WESTALL.

REFERENCES CITED

The following references are of record in the file of this patent:

UNITED STATES PATENTS

| Number | Name | Date |
| --- | --- | --- |
| 1,443,768 | Stahl | Jan. 30, 1923 |
| 1,505,195 | Hansen | Aug. 19, 1924 |
| 1,673,307 | Best | June 12, 1928 |
| 1,785,119 | Gorsuch | Dec. 16, 1930 |
| 2,128,650 | Knoerzer | Aug. 30, 1938 |
| 2,227,624 | Benbow | Jan. 7, 1941 |
| 2,413,096 | Barker | Dec. 24, 1946 |
| 2,427,968 | Hoover | Sept. 23, 1947 |
| 2,441,591 | Owen | May 18, 1948 |